US005245132A

United States Patent [19]

Luetzow

[11] Patent Number: 5,245,132

[45] Date of Patent: Sep. 14, 1993

[54] NOBLE PLATED TUNGSTEN CORONA WIRE FOR COPY MACHINES OR XEROGRAPHY TECHNOLOGY MACHINES

[75] Inventor: Edwin J. Luetzow, Farmington, Minn.

[73] Assignee: Minnesota Technical Research, Inc., Brookings, S. Dak.

[21] Appl. No.: 717,791

[22] Filed: Jun. 19, 1991

[51] Int. Cl.[5] .............................................. H02G 15/02

[52] U.S. Cl. ................................ 174/74 R; 174/94 R; 174/126.2; 439/877; 439/886; 439/887

[58] Field of Search ................. 174/74 R, 94 R, 94 S, 174/126.2; 439/880, 882, 877, 886, 887

[56] References Cited

U.S. PATENT DOCUMENTS

| | | | |
|---|---|---|---|
| 468,293 | 2/1892 | Coleman | 439/882 X |
| 1,631,719 | 6/1927 | Chandler | 174/94 R |
| 3,332,054 | 7/1967 | Fernandes | 439/877 X |
| 3,566,008 | 2/1971 | Ettlinger et al. | 174/94 R |
| 3,688,245 | 8/1972 | Lockshaw | 174/94 R X |
| 3,777,051 | 12/1973 | Ziegler, Jr. et al. | 174/94 R |
| 4,109,289 | 8/1978 | Kuge et al. | 361/230 |
| 4,338,614 | 7/1982 | Pressman et al. | 346/159 X |
| 4,394,533 | 7/1983 | Naito | 174/74 R |
| 4,396,819 | 8/1983 | Muchkin et al. | 219/91.21 |

*Primary Examiner*—Morris H. Nimmo
*Attorney, Agent, or Firm*—Hugh D. Jaeger

[57] ABSTRACT

Noble plated tungsten corona wire for copy machine or xerography technology machines and method of securing terminal connectors to the ends of the noble plated tungsten corona wire. The terminal or crimping tab have compound radii to provide for a solid-state diffusion weld and to prevent stress at a junction of the wire and the terminal or the crimping tab.

2 Claims, 6 Drawing Sheets

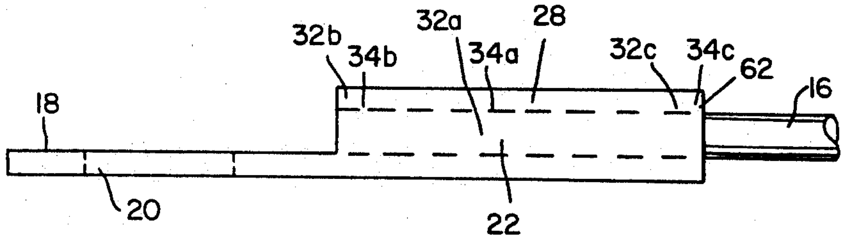
FIG. 11
FIG. 12
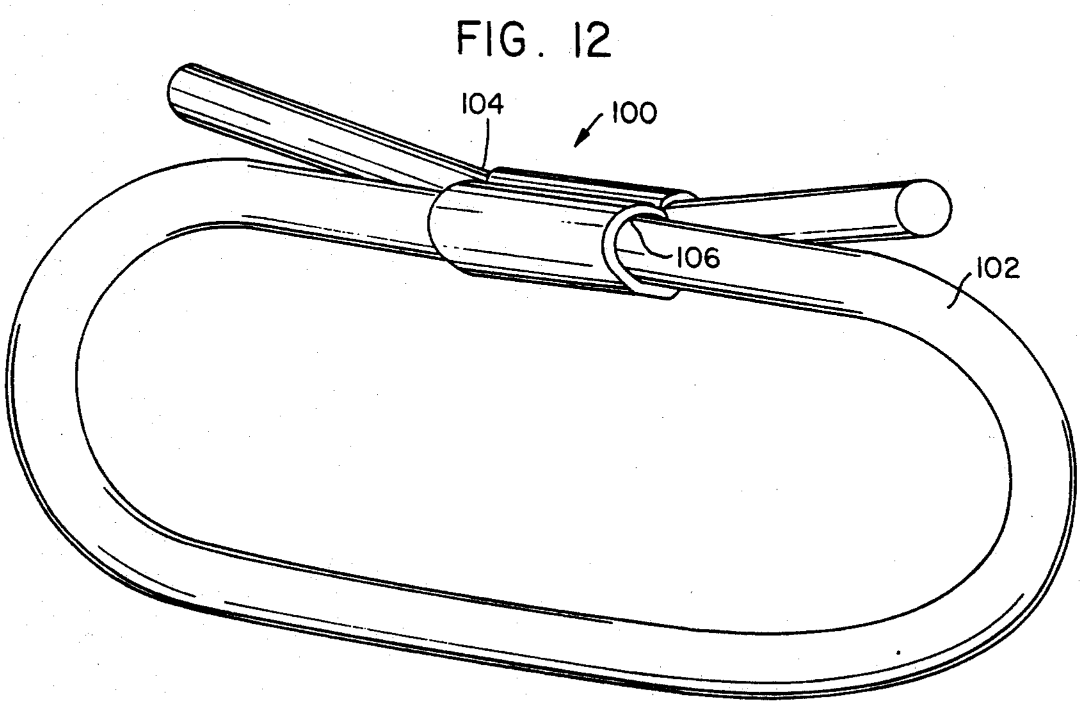

NOBLE PLATED TUNGSTEN CORONA WIRE FOR COPY MACHINES OR XEROGRAPHY TECHNOLOGY MACHINES

CROSS REFERENCE TO CO-PENDING APPLICATIONS

None.

BACKGROUND OF THE INVENTION

1. Field of the Invention

The present invention pertains to electrostatic printing, and more particularly, pertains to a non-corrosive corona wire and method of terminal securement to the end points of the non-corrosive corona wire.

2. Description of the Prior Art

Current technology typically uses a small diameter tungsten wire, such as a 0.003 inch diameter wire having a coating of vitrified carbon about its surface which provides a small degree of corrosion protection to the encompassed tungsten wire from the high concentration of $O_3$ which is generated by the corona about the wire when used in a xerographic process. The vitrified carbon coating around the wire is in general a dry graphite lubricant which remains from the drawing process. Any breaks, thin spots or unevenness in this vitrified carbon coating can and will expose the underlying tungsten wire to the ozone in the corona, and consequently, oxidizing the tungsten to $WO_2$. This oxidized area, particularly in a humid environment, will virtually increase the tungsten wire diameter, thus altering the surface geometry resulting in a nonlinear distribution of the electrostatic charge. The electrostatic charge gradient will consequently cause density gradients and aberrations in the completed copy.

The present invention overcomes the problems encountered in the prior art by providing a noble metal plated tungsten wire and a method of termination securement whereby the inert noble metal surface protects the tungsten from an ozone attack.

SUMMARY OF THE INVENTION

The general purpose of the present invention is a gold plated corona wire secured in a gold plated terminal or crimping tab with compound radii. The terminal and wire are joined in a solid-state diffusion weld developed by a molecular shear.

The present invention pertains to an inert noble metal surface tungsten wire and more particularly to the method of termination securement about the ends of the inert noble metal surface tungsten wire. A inert noble metal surface tungsten wire presents a difficult termination problem in that tungsten cannot be welded and the change in crystal structure results in a wire which is brittle in nature. The inert noble metal surface tungsten wire cannot be crimp terminated in a normal fashion as the compressive strength of tungsten is too great. The present invention discloses a novel crimping process that results in a solid-state diffusion weld between the inert noble gold on the tungsten wire and identical plating on a terminal. A special stainless steel terminal for use on the wire end is designed having a crimp end portion being the same diameter of an conforming to the diameter of the wire. Dies of appropriate dimensional parameters conform to the radius, width, breadth, length and thickness of the crimp end of the terminal so that the encompassing crimp end of the terminal conforms in frictional engagement over and about the wire end. No sharp edges are created which cause flex fatigue fracture failures such as those incurred in common crimping.

A significant aspect and feature of the present invention is a gold plated corona wire which lasts longer than the prior art corona wires.

Having thus described embodiments of the present invention, it is a principal object hereof to provide a gold plated corona wire.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 11 illustrates a side view of a terminal crimped about the central wire member; and, FIG. 12 illustrates a perspective view of a crimping tab with a loop of wire.

DESCRIPTION OF THE PREFERRED EMBODIMENTS

Figure 1:
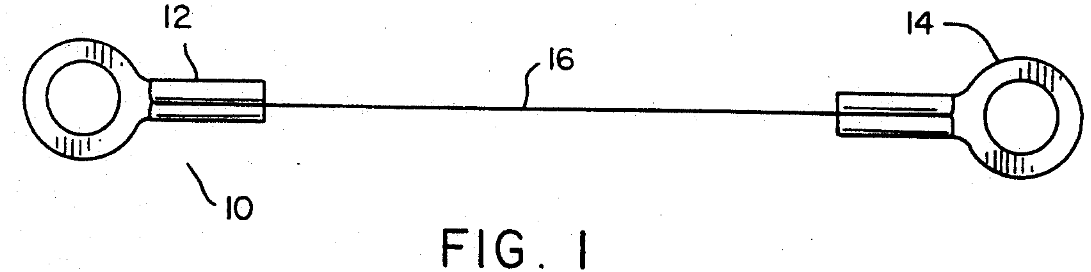
FIG. 1 illustrates a plan view of a noble plated corona wire, the present invention.

FIG. 1 illustrates a plan view of a noble plated tungsten corona wire 10, the present invention, also known as the corona wire 10. The corona wire 10 includes like opposing stainless steel terminals 12 and 14 secured to both ends of a central wire member 16. The central wire member 16 is tungsten and includes firstly a nickel plating and secondly a gold plating about the exterior of the tungsten central wire member 16 as later illustrated in detail. The stainless steel terminals 12 and 14 are likewise nickel and gold plated about their exterior. By way of example and for purposes of illustration only and not to be construed as limiting of the present invention, the tungsten wire is about 0.003 inches with about 3% gold plating by weight. The terminal with the compound radii tab edges are crimped. The terminal is stainless steel with a nickel strike and a gold plating of 25 millionths of an inch.

Figure 2:
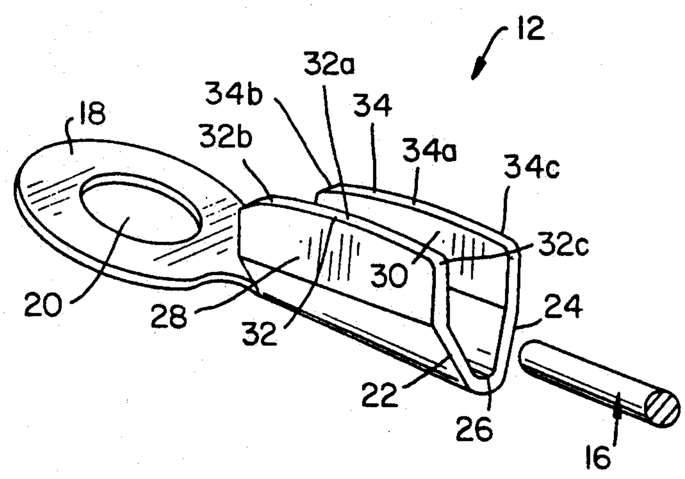
FIG. 2 illustrates a perspective view of the terminal prior to crimping over and about a central wire member.

FIG. 2 illustrates a perspective view of a terminal 12 prior to crimping over and about the central wire member 16 where all numerals correspond to those elements previously described. The one-piece terminal 12 includes a round planar portion 18, a central hole 20 centered in the round planar portion 18, opposing angled planar members 22 and 24 forming a "V" shape with a radiused curve 26 therebetween, and vertically oriented planar tabs 28 and 30 extending from the angled planar members 22 and 24. The upper radiused edges 32 and 34 of the planar tabs 28 and 30 are a compound radius of a large radii 32a and 34a in the center portion with smaller radii 32b, 32c, 34b and 34c at each respective end.

Figure 3:
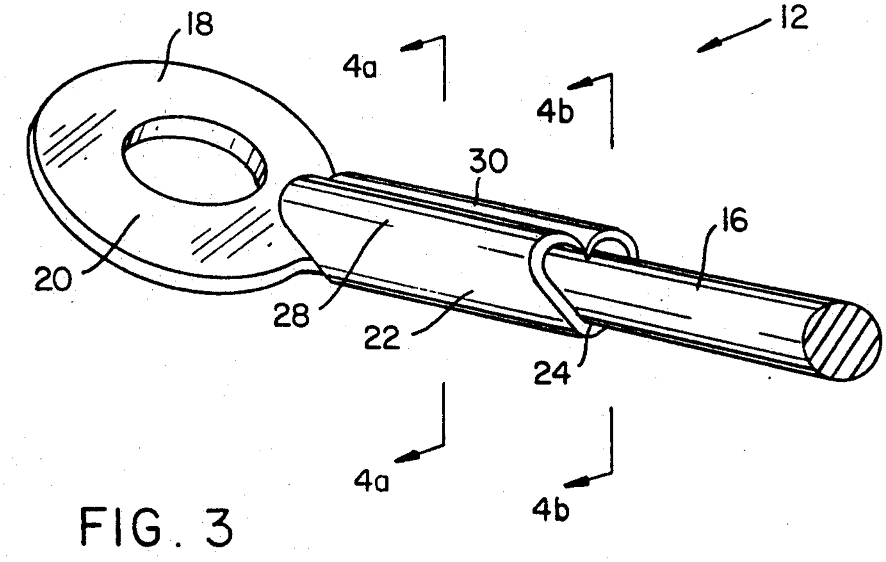
FIG. 3 illustrates a perspective view of a central wire member crimped into a terminal.

FIG. 3 illustrates a perspective view of the central wire member 16 crimped into the terminal 12 showing inwardly curved tabs 28 and 30. This particular geometrical configuration provides for the appropriate support of the central wire member, as well as for metallic shearing for forming a solid-state diffusion weld between the gold layers of the terminal 12 and central wire member 16 as later described in detail. With reference to FIG. 2, 32a and 34a are positioned in a die to meet against each other and against the central wire member 16. Whereas, the corresponding and opposing smaller radii 32b, 34b, 32c and 34c do not meet against each other, nor do they impinge in an undesirable manner upon the central wire member. This is especially important in that this non-contact area does not lie against the central wire member 16, and no nick is formed on the wire member 16. This area is also illustrated in FIG. 11.

Figure 4A:
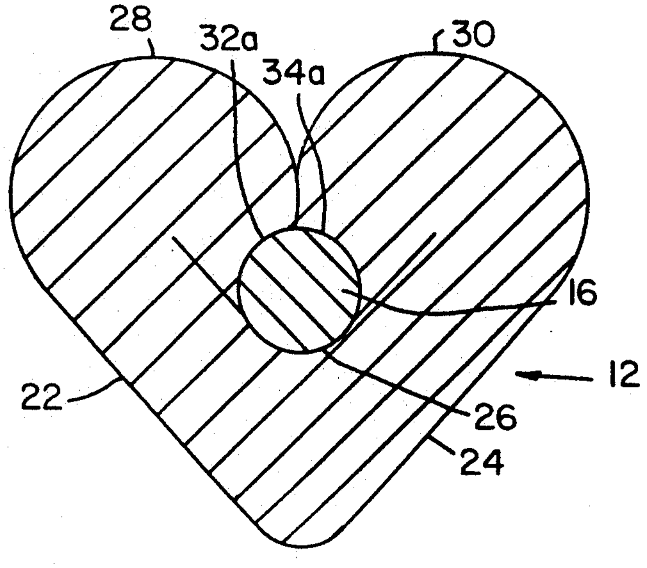
FIG. 4 illustrates a cross-sectional view along line 4A—4A of FIG. 3.
FIG. 4B illustrates a cross-sectional view along line 4B—4B of FIG. 3.

FIG. 4A illustrates a cross-sectional view along line 4A—4A of FIG. 3 of the terminal member 12 crimped against the central wire member 16 where all numerals correspond to those elements previously described. The edges 32a and 34a extrude and assume the shape of the central wire member 16 in the crimping process described in the following figures.

Figure 4B:
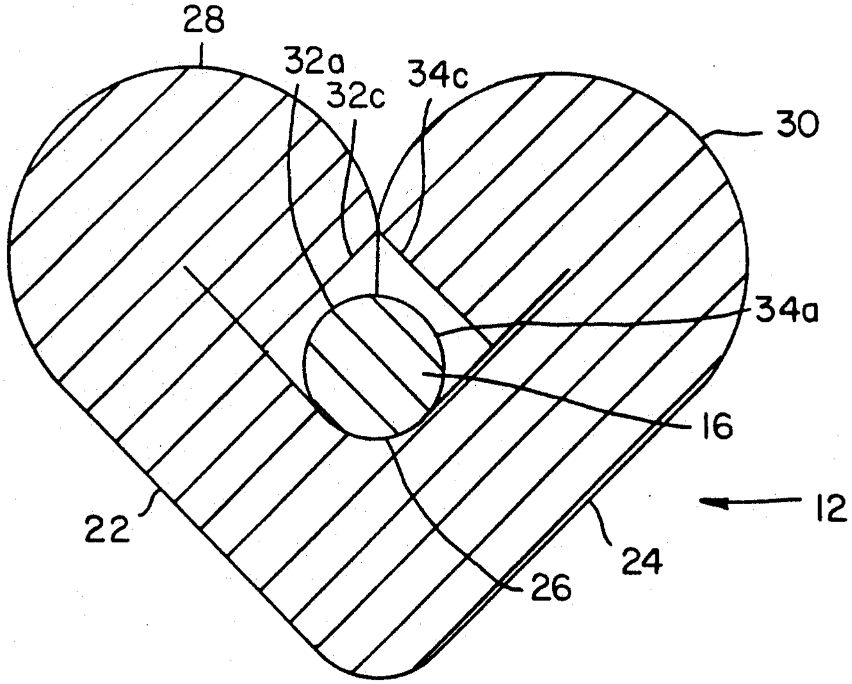

FIG. 4B illustrates a cross-sectional view along line 4B—4B of FIG. 3 of the terminal member 12 crimped against the central wire member 16 where all numerals correspond to those elements previously described. Illustrated in particular is the point of non-contact or area of allowable flex of the terminal 12 with the central wire member 16. To be more specific, the radii 32c and 34c of the edges 32 and 34 approach the central wire member 16, but do not contact it at the edge of the terminal 12, thus allowing a small area for flex of the central wire member 16 within the crimped portion of the terminal including tabs 28 and 30.

MODE OF OPERATION

Figure 5:
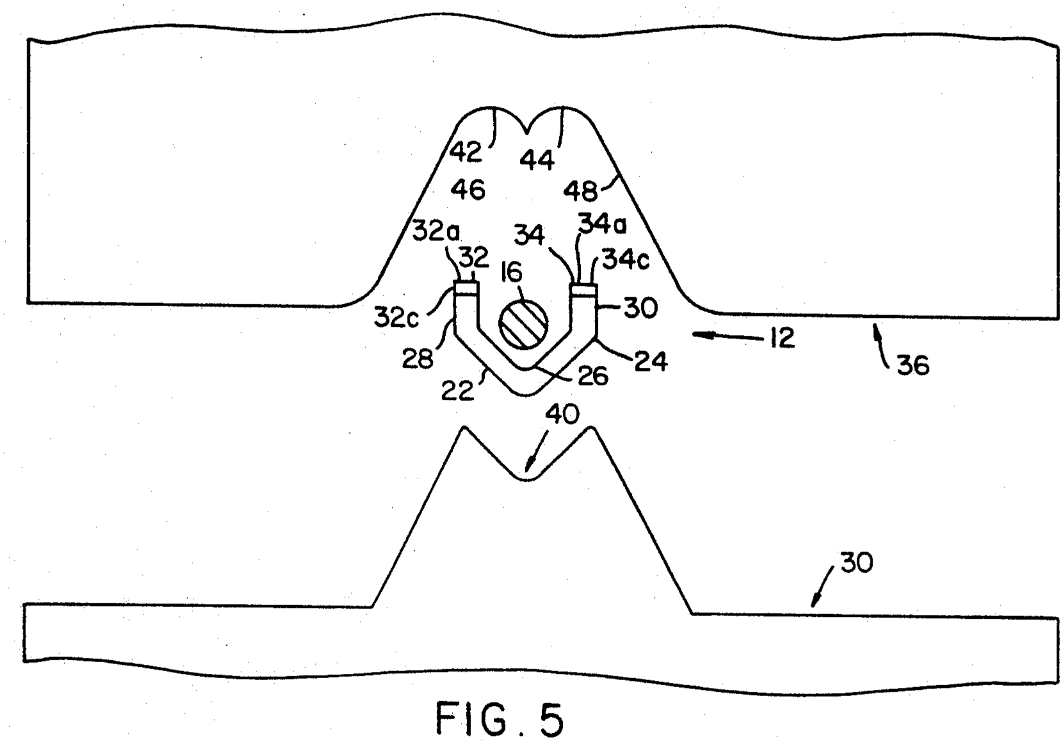
FIG. 5 illustrates the crimping portion of the terminal and the central wire member between die halves.

FIG. 5 illustrates the crimping portion of the terminal 12 and the central wire member 16 between dies 36 and 38 where all numerals correspond to those elements previously described. Die 38 includes a "V" shaped form area 40 into which the terminal member 12 aligns. The die 36 includes curved portions 42 and 44 with adjacent slanted surfaces 46 and 48 which form the tabs 28 and 30 inwardly and downwardly against the central wire member 16.

Figure 6:
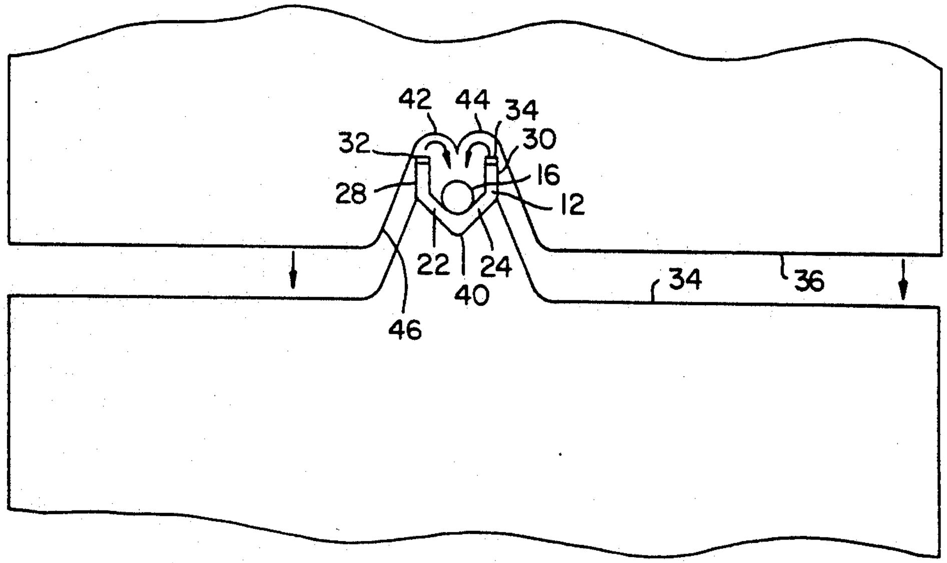
FIG. 6 illustrates the action of the dies with respect to the terminal and the central wire member.

FIG. 6 illustrates the action of the die 36 and 34 with respect to the terminal 12 and central wire member 16 where all numerals correspond to those elements previously described. The slanted surfaces 46 and 48 of the die 36 bend the upper radiused edges 32 and 34 inwardly toward the center. The curved surfaces 42 and 44 curve the radiused edges 32 and 34 downwardly and against the central wire member 16 and also form it under very high pressure as illustrated in FIG. 7.

Figure 7:
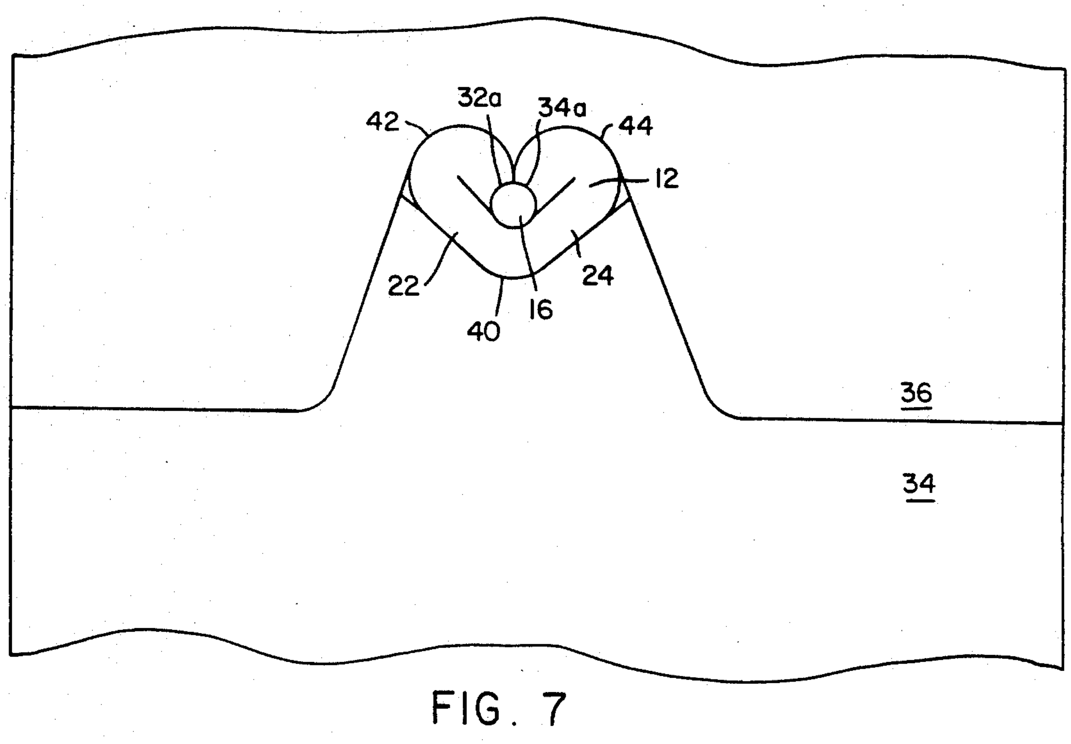
FIG. 7 illustrates the terminal crimped and formed over and about the central wire member.

FIG. 7 illustrates the terminal 12 crimped and formed over and about the central wire member 16 where all numerals correspond to those elements previously described. Pressures of 300,000 psi are applied at the dies 36 and 38 to cause a solid-state diffusion welding, as well as extrusion of the radiused edges 32a and 34a along, over and about the central wire member 16. The central wire member 16 has a hard tungsten core with a coating of intermediate nickel and an external gold coating. During compression of the dies 36 and 38, the hard tungsten remains the same size, but the gold and nickel coatings on both the terminal 14 and the central wire member 16 are extruded, resulting in a molecular shear of the metals, forming a solid-state diffusion weld.

Figure 8:
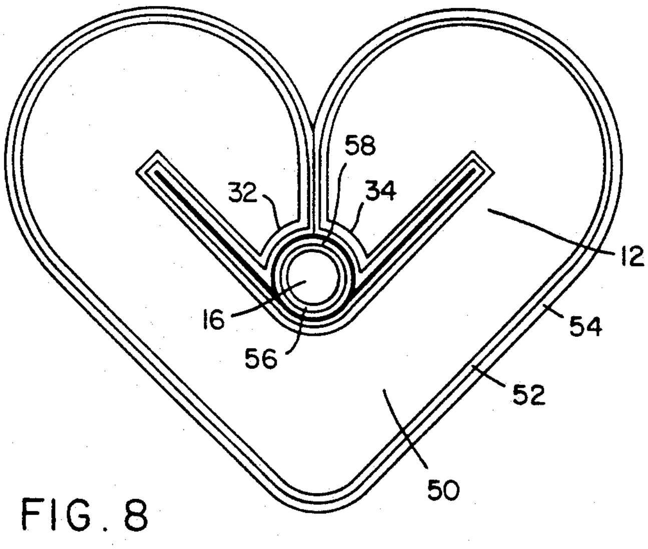
FIG. 8 illustrates the composition of the terminal and the central wire.

FIG. 8 illustrates the composition of the terminal 12 and central wire member 16 prior to shear movement where all numerals correspond to those elements previously described. The main portion of the terminal is stainless steel 50 having a coating of nickel 52 and then a coating of gold 54 over the nickel coating 52. The central wire member 16 includes a nickel strike coating 56 and a successive gold plating coating 58.

Figure 9:
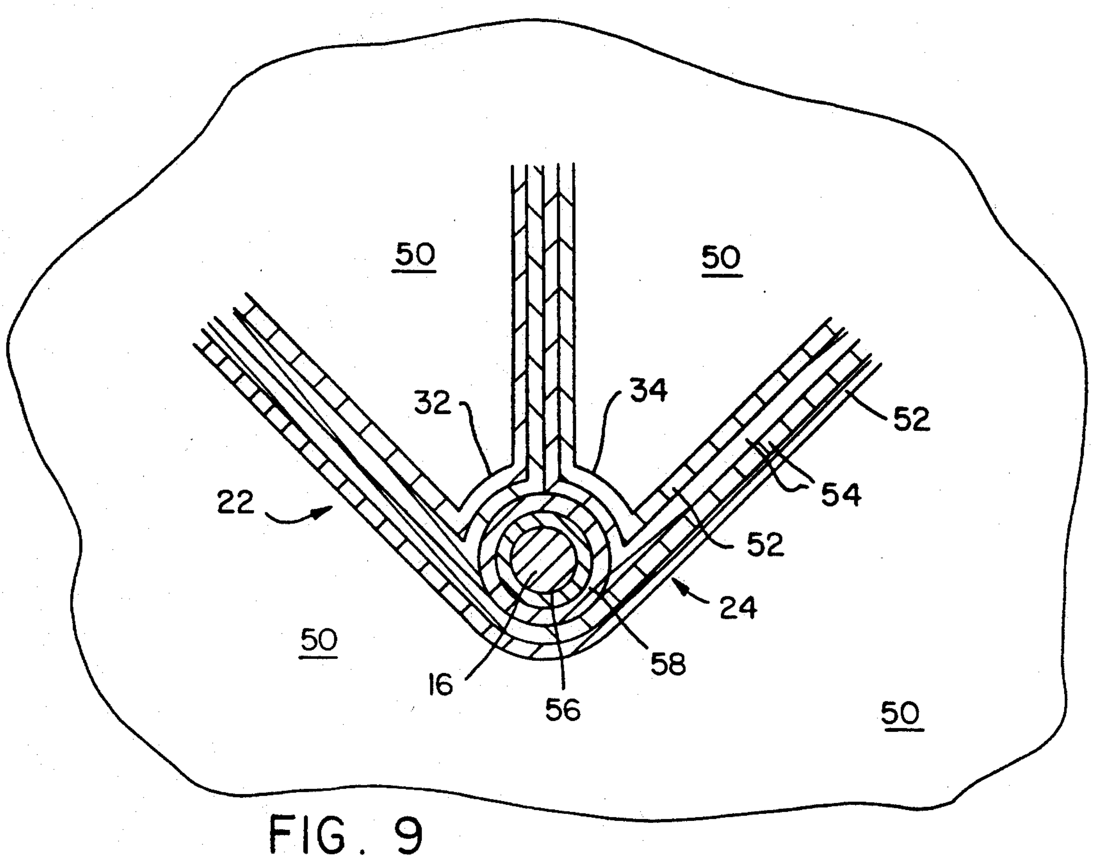
FIG. 9 illustrates a close-up view of the terminal and central wire member prior to shear movement.

FIG. 9 illustrates a close-up view of the terminal 12 and central wire member 16 prior to shear movement where all numerals correspond to those elements previously described.

Figure 10:
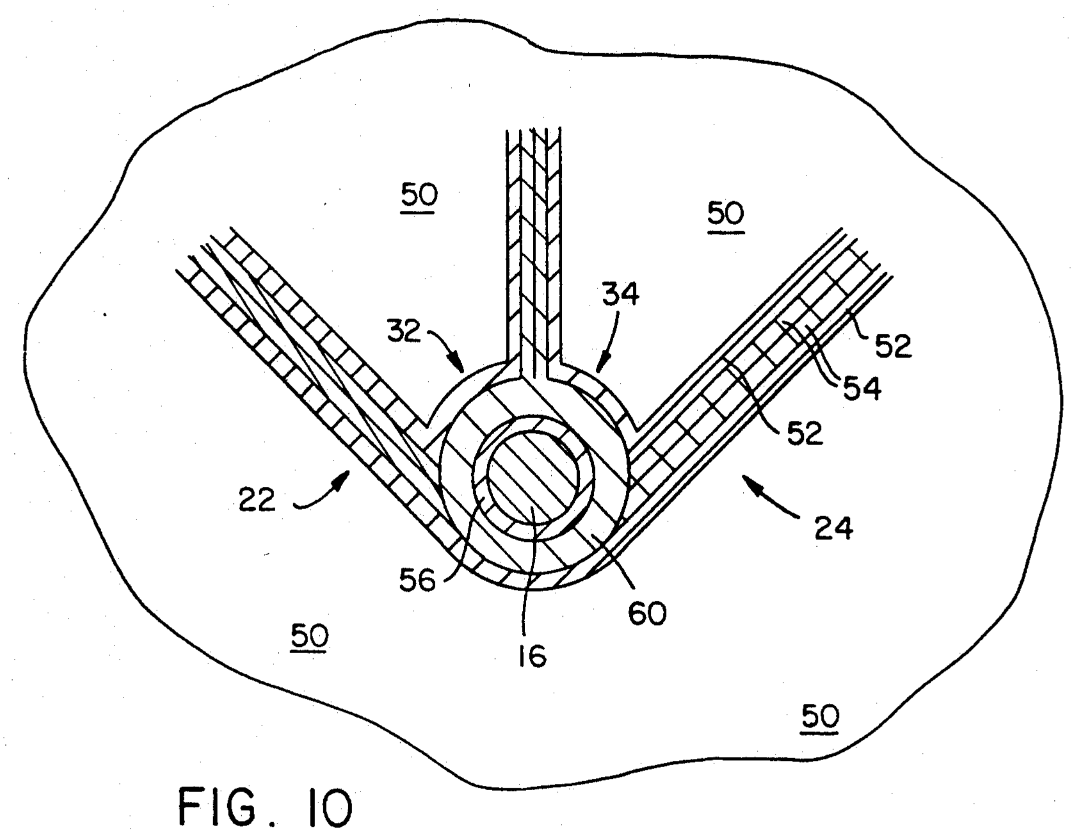
FIG. 10 illustrates a close-up view of the terminal and central wire member after shear has occurred.

FIG. 10 illustrates a close-up view of the terminal 12 and the central wire member 16 after shear movement where all numerals correspond to those elements previously described. As the shear occurs, a weld is formed by the gold plating 54 of the terminal 14 and the gold plating 58 of the central wire member 16. Extrusion of the radiused edge 32 and 3 also occurs over, about and along the central wire member 16.

FIG. 11 illustrates a side view of the terminal 12 crimped about the central wire member 16. Illustrated in particular is the non-contact area which is the area between the small radii 32c and 34c and the central wire member. Having incorporated the radii 32c and 34c instead of a hard sharp corner or edge lessens the possibility of forming a nick in the wire, whereby fatigue could prematurely cause breakage of the central wire member 16.

DESCRIPTION OF THE ALTERNATIVE EMBODIMENTS

FIG. 12 illustrates a perspective view of crimping tab 100 which is the terminal of FIGS. 1-11 with the round planar portion cut off. The wire 102 is passed through as illustrated in a loop. It is optional where the ends remain or are cut off adjacent the ends 104 and 106.

Various modifications can be made to the present invention without departing from the apparent scope hereof.

I claim:

1. Corona wire with terminals comprising:
   a. a gold plated tungsten wire; and,
   b. a stainless steel terminal with nickel strike and gold plating with compound radii tab edges secured at each end of said gold plated tungsten wire.
2. Corona wire comprising:
   a. a gold plated tungsten wire; and,
   b. a stainless steel crimping tab with nickel strike and gold plated compound radii tab edges securing each end of said gold plated tungsten wire.

* * * * *